April 18, 1933. A. MALEC 1,904,155
EJECTING MECHANISM
Filed Dec. 10, 1928 2 Sheets-Sheet 1

Inventor
Anthony Malec
By N. A. Patterson Att'y

April 18, 1933.     A. MALEC     1,904,155
EJECTING MECHANISM
Filed Dec. 10, 1928     2 Sheets-Sheet 2
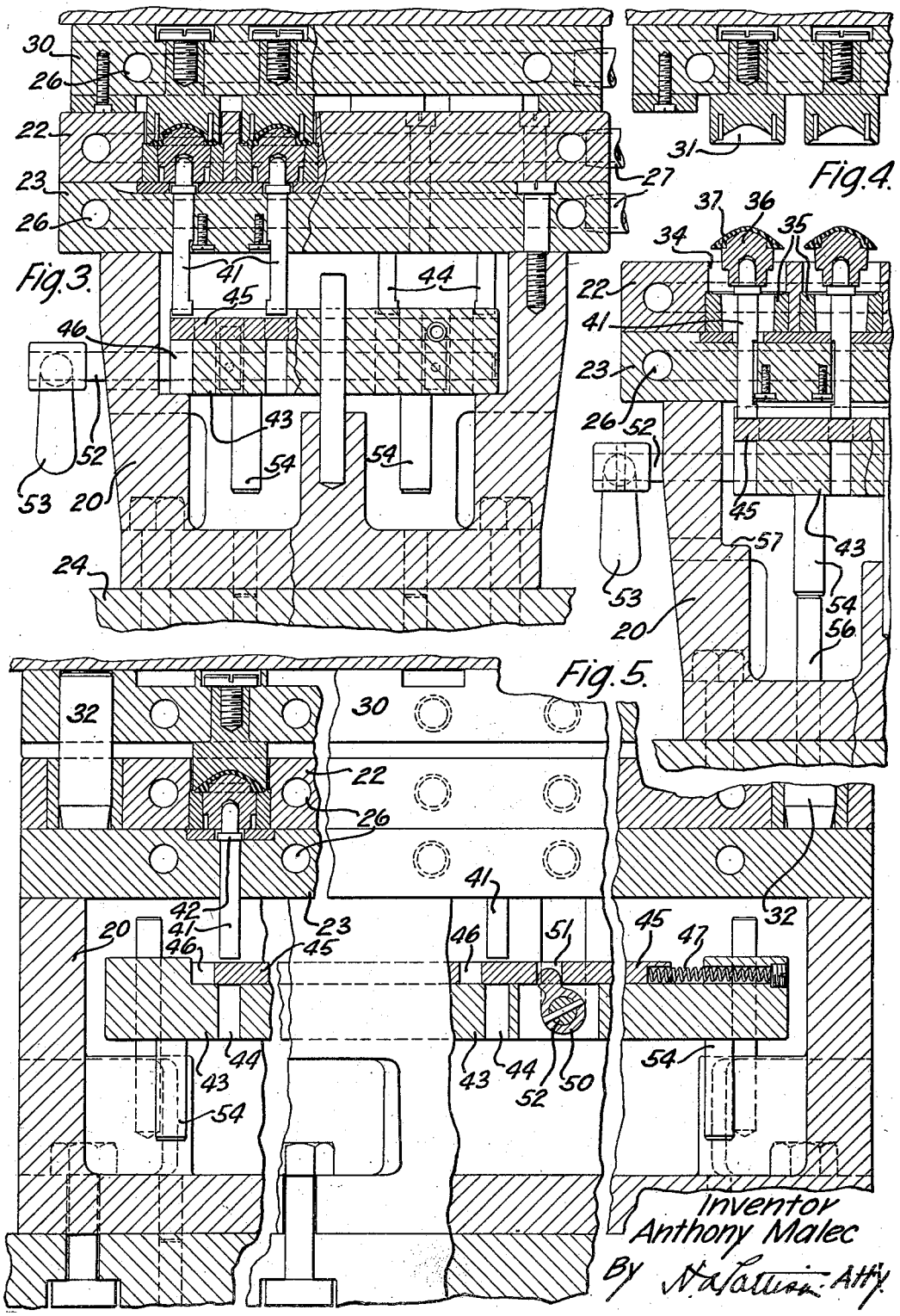
Inventor
Anthony Malec Patented Apr. 18, 1933

1,904,155

UNITED STATES PATENT OFFICE

ANTHONY MALEC, OF BROOKFIELD, ILLINOIS, ASSIGNOR TO WESTERN ELECTRIC COMPANY, INCORPORATED, OF NEW YORK, N. Y., A CORPORATION OF NEW YORK

EJECTING MECHANISM

Application filed December 10, 1928. Serial No. 324,872.

This invention relates to ejecting mechanisms, and more particularly to ejecting devices for molding presses of the multiple mold type having ejecting means individual to each mold cavity.

It is the practice in some cases to employ molding presses having a vertically reciprocating mold plate and a relatively stationary mold plate, the reciprocating mold plate being provided with ejector pins which, during its movement away from the other mold plate, travel with it for a certain distance, when their further movement is arrested by impingement against a stationary member. It is necessary, in order to reload a machine employing this type of ejecting mechanism, to move the reciprocating mold plate part back to its operative compressing position, which leaves insufficient clearance between the mold plates to allow the dies to be reloaded unless the relatively stationary mold plate is swung out of its normal position, which operation requires additional mechanism and actuating means.

An object of this invention is to provide an ejecting mechanism in which the article is readily and quickly ejected without interfering with the molding operations or the accessibility of the molds.

In order to accomplish these and other objects, one embodiment of the invention contemplates the use of an ejecting mechanism with a hydraulic press wherein a knockout device is constructed with a pin individual to each mold cavity, which pins are moved with the ram of the molding press for a predetermined distance, whereupon further movement is prevented due to the arresting of a member carrying a plate with which knockout pins cooperate, consequently holding the parts from following the mold section. After the removal of the molded parts the plate is released thereby allowing the descent of the pins and permitting the refilling of the mold cavities.

Figure 1:
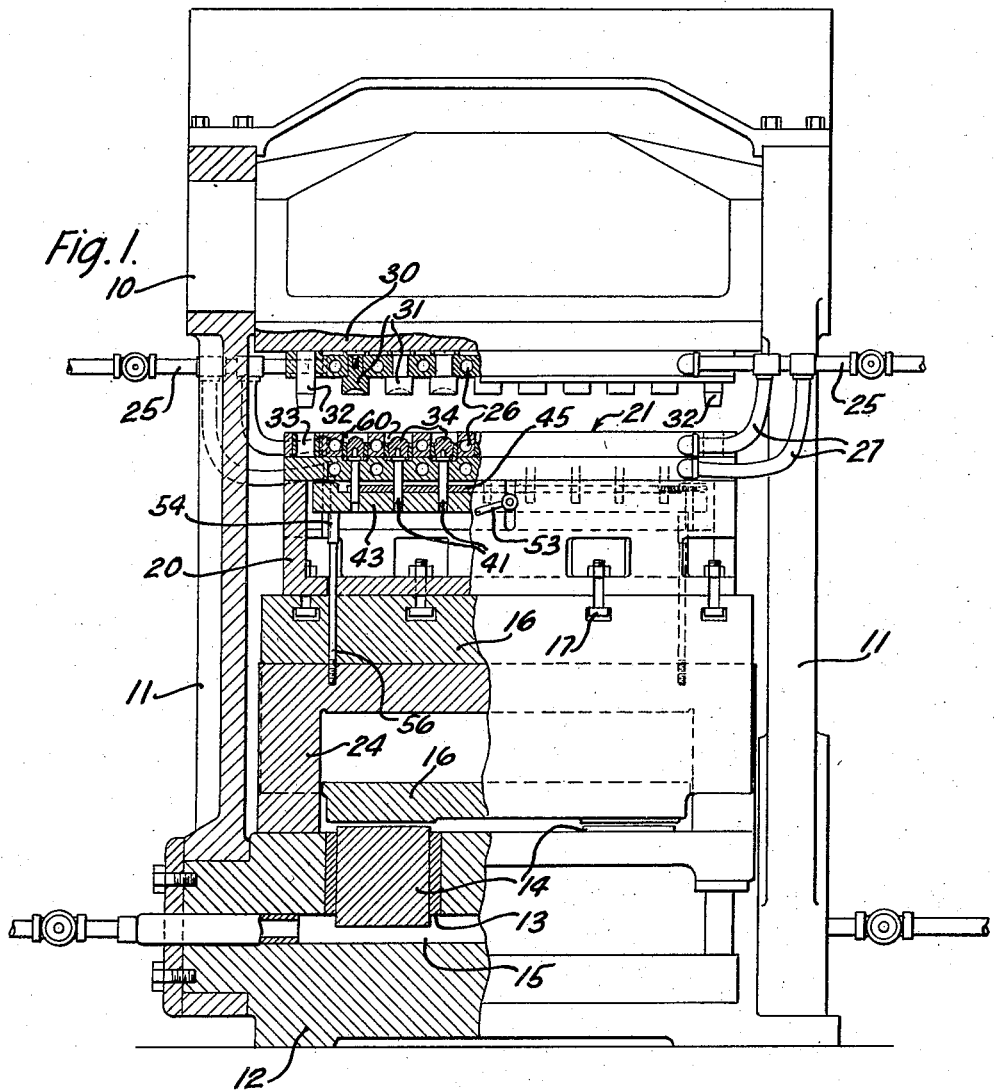
Figure 2:
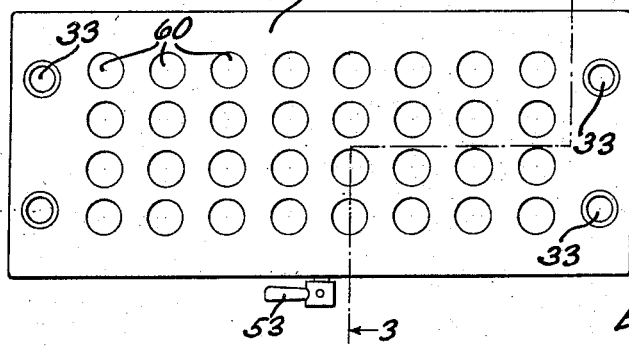
Figure 6:

A complete understanding of the invention will be had by reference to the following description, taken in conjunction with the accompanying drawings, in which, Fig. 1 is a side view, partly in section, of a molding press embodying the invention, showing the mold plates in the open position and the ejector pins in the down position to permit the mold cavities to be refilled, Fig. 2 is a plan view of the lower mold plate, Fig. 3 is an enlarged transverse sectional view taken on the line 3—3 of Fig. 2, showing the mold plates in the closed position, Fig. 4 is a sectional view similar to Fig. 3, but showing the position of the parts when the mold plates are in the extreme open position and the ejector pins are in the raised position, Fig. 5 is a side view, partly in section, showing the position of the parts when the mold plates are in the closed position, and Fig. 6 is a perspective view of the finished product as manufactured by the particular machine being described.

Referring more particularly to the drawings in which similar reference characters are employed to denote similar parts throughout the various views, the framework of the press is of a usual construction, and comprises an upper portion 10 supported by uprights 11 which are mounted on a stationary base 12, as shown in Fig. 1. The base is provided with two cylinders 13, in which are mounted hydraulic rams 14, only one of the cylinders and rams being shown in detail, since they are identical in construction. A passage 15 extends laterally through the base and is designed to supply water or other fluid under pressure for actuating the rams. A mold bolster 16 is positioned above the rams 14 and is fixed by means of bolts 17 to the U-shaped members 20, the latter in turn supporting the lower mold plate 21, which consists of an upper section 22 and a lower section 23 (Fig. 3). It will be seen that the lower mold plate is adapted to reciprocate vertically and that the motion of the rams is transmitted thereto through the medium of bolster 16 and U-piece 20. A stationary yoke 24 is positioned to limit the downward movement of bolster 16. The mechanism thus far described may be of any suitable construction. The press may be provided with the usual pipes 25 for supplying heating and cooling fluids to passages 26 in the mold plates when necessary, the lower mold plate being connected to the pipes by means of flexible tubes 27.

An upper mold plate 30 is supported in the upper portion of the press frame, and is provided with upper dies 31 which may be of any form adapted to the production of the specific articles to be produced by the press. The upper mold plate also carries a plurality of guide pins 32 which cooperate with sockets 33 formed in the lower mold plate 21 to secure accurate alignment between the upper and lower dies. Each of the lower dies 34 comprises a sleeve 35 fixedly mounted in the lower mold plate and a mold insert 36 slidably and removably mounted within the sleeve, the sleeve and mold insert having their upper surfaces shaped to correspond to the under surface of the article 37 to be molded. In the illustrated embodiment, as best seen in Fig. 6, the molded article is recessed at its lower surface and threads 40 are formed therein by corresponding threads formed in the molding surface of insert 36. The lower surface of the insert is provided with a socket which detachably receives the upper end of an ejector pin 41 which is slidably mounted in the lower section 23 of the lower mold plate. Each ejector pin is provided with a shoulder 42 which abuts against the lower section 23 to limit the downward movement of the pin.

A knock-out ejector plate 43 is mounted beneath the lower mold plate, and is provided with a plurality of holes 44 which are in alignment with the ejector pins 41. A sliding plate 45 is slidably mounted on the knock-out plate, and is provided with a plurality of holes 46 which, as best seen in Fig. 5, are normally out of alignment with ejector pins 41. The sliding plate is normally held in the position shown in Fig. 5 by means of a compression spring 47 mounted in a socket in the knock-out plate and urging the sliding plate to the left. In order to move the sliding plate so that its holes will align with the pins, a rocking cam 50 is provided which has a projection extending into a slot 51 in the sliding plate, the cam being mounted upon a shaft 52 and actuated by means of a handle 53 located at the side of the machine. It will be seen that actuation of the handle will cause the cam to rock, thereby moving the sliding plate so as to align its holes 46 with pins 41 and holes 44. The knock-out plate 43 is provided with a pair of downwardly extending pins 54 which are aligned with bores 55 in the lower portion of the member 20. A pair of stationary pins 56 are threaded into the yoke 24 and extend upwardly therefrom, having slidable relation to bolster 16 and member 20. The stationary pins 56 are in alignment with the respective knock-out pins 54, and their function is to abut against the knock-out pins upon downward movement of the rams and associated mechanism to cause relative movement between the knock-out plate 43 and the member 20 to thereby raise the ejector pins 41 relative to the lower mold plate and cause the ejection of the molded parts. This ejecting operation, however, is dependent upon the sliding plate 45 having been moved to the left as viewed in Figs. 1 and 5; if the knock-out plate is at its right hand position, as it is shown in Fig. 1, the knock-out plate will be moved upwardly when pins 56 abut against knock-out pins 54, but such movement will have no effect upon the ejector pins. When the knock-out plate 43 is not supported by pins 56, as above described, it rests upon shoulders 57 of the member 20.

The operation of the device is as follows. The parts being in the positions shown in Fig. 1, the mold cavities 60 are filled with granulated phenol plastic compound or other material to be compressed. Pressure fluid is then admitted to the passage 15, and the rams move upwardly, causing the mold bolster 16, the member 20, and the lower mold plate 21 also to move upwardly and compress the powder or other material into molded articles.

During the first part of such upward movement, the knock-out plate 43 and sliding plate 45 remain stationary while the ejector pins move upwardly therethrough, but when the ejector pins have cleared the holes 46 in the sliding plate 45, spring 47 moves the sliding plate to the left, causing it to assume the position shown in Fig. 5, wherein the holes 46 and 44 are out of alignment. As the upward movement of the lower mold plate continues, shoulder 57 contacts with the lower surface of the knock-out plate 43, causing the plate 43 to move upwardly in unison with the other moving parts until the upper limit of the pressure stroke is reached. The parts are now in the position shown in Figs. 3 and 5. The supply of pressure fluid is thereupon discontinued either manually or automatically, and the rams allowed to descend, thereby lowering bolster 16, member 20 and lower mold plate 21 to their original positions. The knock-out plate 43, riding on shoulders 57 moves downwardly with the other moving parts until pin 54 contacts with stationary pin 56, when its movement is arrested, whereupon the ejector pins are raised with respect to mold plate 21 and the finished articles are caused to project above the upper surface of the mold plate as shown in Fig. 4. The articles, together with the removable inserts 36, are then removed from the machine and passed to another operator to be separated by unscrewing.

A new set of inserts 36 is then placed in the machine, the mold plates cleaned by a stream of compressed air or other means, and the handle 53 moved upwardly until holes 44 and 46 come into registry, when the ejector pins drop therethrough, holding the sliding plate against movement in response to the pressure exerted by spring 47. The inserts 36, of course, fall into place as soon as the ejector pins drop through the holes 44 and 46. The parts are now in the position shown in Fig. 1, and the process just described may be repeated. It will be noted that this mechanism permits reloading of the mold cavities while the lower mold plate is in its extreme downward position, thereby making it unnecessary to swing the upper mold plate out of its normal position. This feature is especially important when the molded parts are of such shape as to require a relatively long lift to clear them of the mold cavities.

If so desired, the lower mold plate may be lowered from its uppermost or closed position as shown in Figs. 3 and 5 to the open position shown in Fig. 1 without the molded parts being ejected by the ejector pins. This is accomplished by moving the sliding plate 45 to the right against the pressure of the spring 47 by manually turning the lever 53 as explained above, and holding it in such position during the downward movement of the lower mold plate. With the sliding plate 45 moved to the right, the holes 44 and 46 in the knock-out plate and sliding plate are aligned and the ejector pins will not be arrested in their downward movement by the sliding plate, but will drop into the holes, enabling the operator to inspect the molded parts without causing them to be ejected.

While the invention has been described with reference to a specific type of molding press, it will be understood that it may be applied to other types of presses as well, and that various modifications may be made without departing from the spirit of the invention as defined in the following claims.

What is claimed is:

1. In a press, the combination of a vertically reciprocable mold plate, an ejector pin slidably mounted therein, a horizontally slidable plate having an aperture adapted to move into and out of registry with the ejector pin, a vertically movable support for the slidable plate, means for arresting the downward movement of the support during the downward movement of the mold plate, and means operable when the mold plate is at the bottom of its travel to move the sliding plate and thereby bring the aperture in the sliding plate into registry with the ejector pin and allow the ejector pin to drop therein.

2. In a press, a vertically reciprocable mold plate, an ejector pin carried thereby and movable to an ejecting position, means for moving the mold plate upwardly to compressing position, a horizontally slidable plate having an aperture adapted to move into and out of registry with the ejector pin, a movable support for the slidable plate, means operative when the mold plate has moved to an intermediate position to move the support upwardly, and yielding means operative to move the sliding plate as soon as the ejector pin is lifted clear thereof so that the aperture in the sliding plate is out of registry with the ejector pin.

3. In a press, a vertically reciprocable mold plate, an ejector pin carried thereby and movable to ejecting position, a horizontally slidable plate having an aperture adapted to move into and out of registry with the ejector pin, a movable support for the sliding plate, means operative to start the upward movement of the said support after the mold plate has moved upwardly to an intermediate position, and spring means automatically operative when the ejector pin is clear of the sliding plate to move the sliding plate to such a position that the aperture in the sliding plate is out of registry with the ejector pin.

4. In a molding press, a plurality of vertically reciprocable mold sections for receiving material to be molded, means for causing relative opening and closing movements thereof, an ejector pin movable with one of the mold sections, a horizontally slidable plate provided with an aperture into and out of which the ejector pin may move, a vertically movable support for the slidable plate, means for arresting the downward movement of the support during the downward movement of said mold sections, a spring operable upon the slidable plate to slide the plate and remove the aperture contained therein from alignment with the ejector pin to produce relative movement between the pin and one of the mold sections, and means operable when the mold plate is at the bottom of its travel to move the sliding plate and thereby bring the aperture in the sliding plate into registry with the ejector pin and allow the ejector pin to drop therein.

In witness whereof, I hereunto subscribe my name this 30th day of November A. D., 1928.

ANTHONY MALEC.